United States Patent [19]
Hunte

[11] Patent Number: 5,835,342
[45] Date of Patent: *Nov. 10, 1998

[54] COMPUTER DESKTOP-KEYBOARD COVER WITH BUILT-IN MONITOR SCREEN AND WRIST SUPPORT ACCESSORY

[76] Inventor: Stanley G. Hunte, P.O. Box 376, Maywood, Ill. 60153

[ * ] Notice: The term of this patent shall not extend beyond the expiration date of Pat. No. 5,781,406.

[21] Appl. No.: 831,643

[22] Filed: Apr. 9, 1997

Related U.S. Application Data

[63] Continuation-in-part of Ser. No. 611,201, Mar. 5, 1996, Pat. No. 5,781,406.

[51] Int. Cl.$^6$ .............................. G06F 1/16; H05K 5/02
[52] U.S. Cl. ........................ 361/681; 248/918; 400/714
[58] Field of Search .................................. 361/680, 681, 361/682, 683; 400/691, 713, 714, 719; 248/118, 118.1, 118.2, 118.3, 118.5, 917, 918; 312/223.1, 223.2; 364/708.1; G06F 1/16

[56] References Cited

U.S. PATENT DOCUMENTS

| | | | |
|---|---|---|---|
| 4,749,364 | 6/1988 | Arney et al. | 439/372 |
| 4,903,221 | 2/1990 | Krenz | 364/708.1 |
| 5,128,662 | 7/1992 | Failla | 340/752 |
| 5,442,253 | 8/1995 | Van Gorkom et al. | 313/422 |
| 5,446,337 | 8/1995 | Yokomakura et al. | 313/422 |
| 5,451,835 | 9/1995 | Yamazaki et al. | 313/422 |
| 5,465,024 | 11/1995 | Kane | 313/422 |

Primary Examiner—Lynn D. Feild

[57] ABSTRACT

A Computer Desktop-keyboard Cover with built-in Screen Monitor Attachment is disclosed that could take the place of conventional CRT Monitors customarily associated with desktop workstations. Many such keyboards are entirely unprotected. The means described herein will (a) provide protection for all standard keyboards in use, and (b) the combined and compact desktop Keyboard-with-Monitor-peripheral may be stored anywhere when not in use. The Display Monitor utilizies LCD or other Flat-panel display technology. The attachment device is directly and independently connected electrically to the CPU or to the main Server-Interface in a Network environment. It is fitted with multi-media speakers and a floppy disk port. In one aspect, the attachment device is bolted to the keyboard by hinge-arm members. These rotating hinge-arms make it possible for the Cover and Monitor Device to be positioned in many different locations, on or behind the keyboard. In another aspect, the device when attached to the rear edge of the keyboard with articulating hinges, provides a compact composite computer peripheral. The original embodiment of this disclosure takes the form of a "do-it-yourself-attachment-add-on-kit" for existing keyboards. Future desktop keyboards with built-in Screen Monitors will be factory-produced having the Cover hinged to the keyboard, using methods of previous art. Finally, an associated Accessory Device is disclosed, being a combined Keyboard Cover and Ergonomic Wrist Support, having multiple applications.

7 Claims, 13 Drawing Sheets

COMPUTER DESKTOP-KEYBOARD COVER WITH BUILT-IN MONITOR SCREEN AND WRIST SUPPORT ACCESSORY

GENERAL DESCRIPTION

This application is a continuation in part (CIP) of the previous application covered by the Notice of Allowability dated Feb. 27, 1997 in respect of Ser. No. 8/611,201 filed Mar. 5, 1996, now U.S. Pat. No. 5,781,406. The reasons for this CIP application at this time is due to the omission of formal claims for some of the embodiments of the original application, as well as the present inclusion of new matter for additional embodiments now added that are logically pertinent to the substantive invention.

Figure 1:
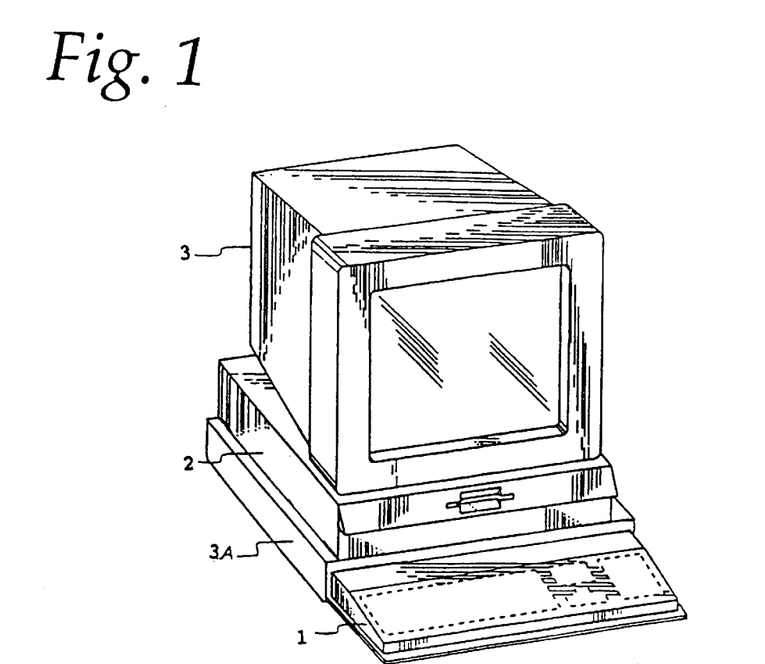
FIG. 1 is a front perspective view of the conventional Computer Desktop workstation, having three peripherals: Desktop Keyboard 1, Systems Unit (CPU) 2 and Cathode Ray Tube (CRT) Monitor; 3. Also shown is a hood-stand and retractable tray for keyboard storage and protection. 3A
Figure 2:
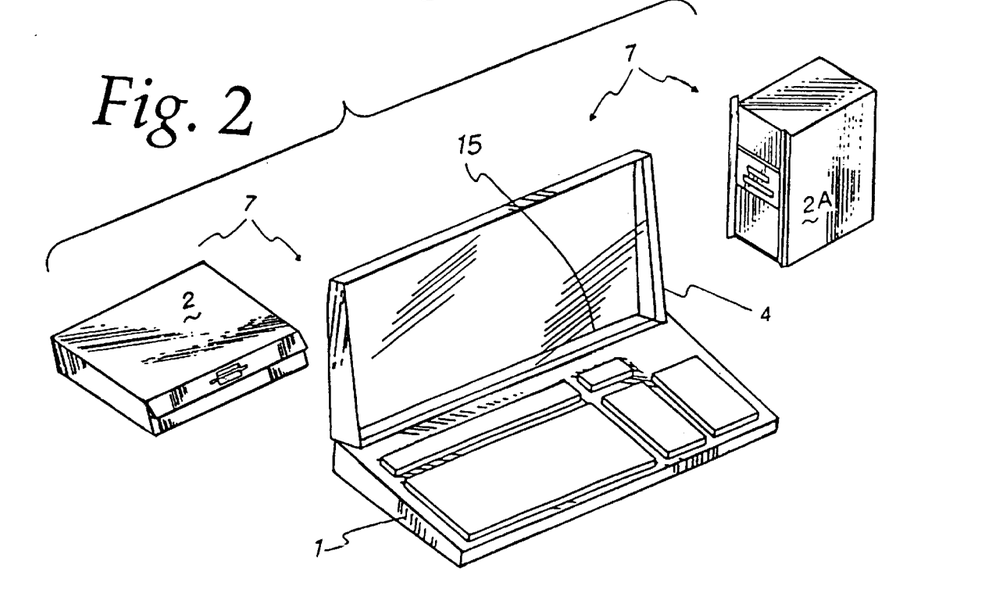
FIG. 2 shows a perspective frontal view of the future 2-piece desktop workstation 7 with only the CPU 2 (or an Interface Unit for a network server 2A) [in broken lines] and the Desktop Keyboard 1 with Attachment device of Cover/Monitor, 4 in [closed and] open position, (Model 3).
Figure 7:
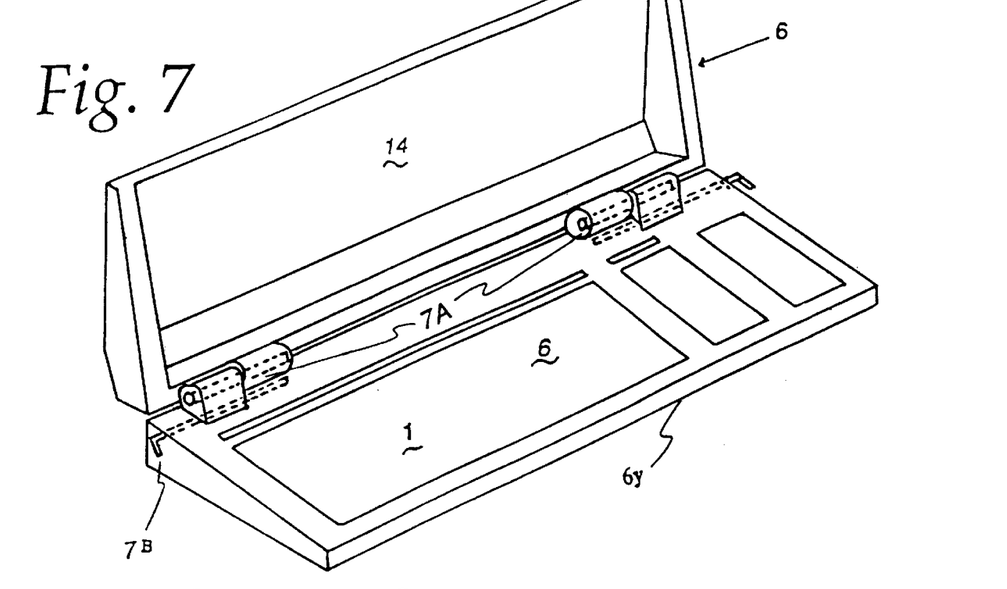
FIGS. 7, 7A 7B show the factory-produced desktop keyboard with the Cover/Monitor device fixedly hinged to the keyboard housing by conventional articulating axle and friction-socket means (of Model 3), in an open position 6. Fragmentary views of hinges in closed, 6x, half-open 6y and fully open positions 6z are shown.

The "Generic Desktop Computer Keyboard Cover & Monitor" describes the Invention of a new addition to computer peripheral equipment for standard Desktop Computer workstations of PCs or Macintosh computers. The conventional 3-piece configuration comprises Keyboard, 1 Systems Unit (CPU), 2 and Cathode-Ray-Tube (CRT) Monitor 3 In some cases there is a hood-stand and tray for the keyboard as well. 3A (FIG. 1). This invention transforms the usual layout into a two-piece configuration namely, Keyboard with built-in Screen Monitor and CPU 7 [or Network Interface 2A] (FIG. 2). For the first time, the large, bulky CRT-Monitor 3 will no longer be essential for the standard desktop configuration; for the present invention provides a device for upgrading existing keyboards and for computer technologists and hardware manufacturers to produce a Desktop Keyboard with Cover-&-Video-Screen-Monitor combined as a single peripheral 6 7 (FIGS. 2, 7). This will replace the CRT-Monitor 3 and convert keyboards from being input-devices only to become output-devices also, for text, multi-media and graphics displays. This invention also provides a Keyboard Cover Accessory 5 (FIG. 3) designed for three main purposes: one, to complement the Cover and Monitor attachment as a means of temporarily covering the keyboard when the Screen Monitor is in live usage by manually placing the accessory over the keys two, when the accessory is placed in front of the keyboard it provides for the first-time ever a wide five-inch ergonomic wrist-support support accessory to prevent or ameliorate the disease of Carpal Tunnel Syndrome (CTS); [5] and three, it serves as a computer mouse-pad on an anti-static cotton-fabric covering. 5. This new concept removes a major drawback for desktop keyboards, namely, they have no cover; but by means of the Cover/Monitor attachment device 4 (FIGS. 3, 4, 11, 14) and the Accessory Cover 5 (FIGS. 3, 4, 11, 14) [they no longer remain unprotected from dust and debris. This new attachment device and the associated accessory have been designed and developed for a "do-it-yourself add-on kit" by owners/users for existing keyboards. This present invention involves innovative designs for attaching the Cover/Monitor device to the Keyboard by means of two-hinging systems.

Figure 3:
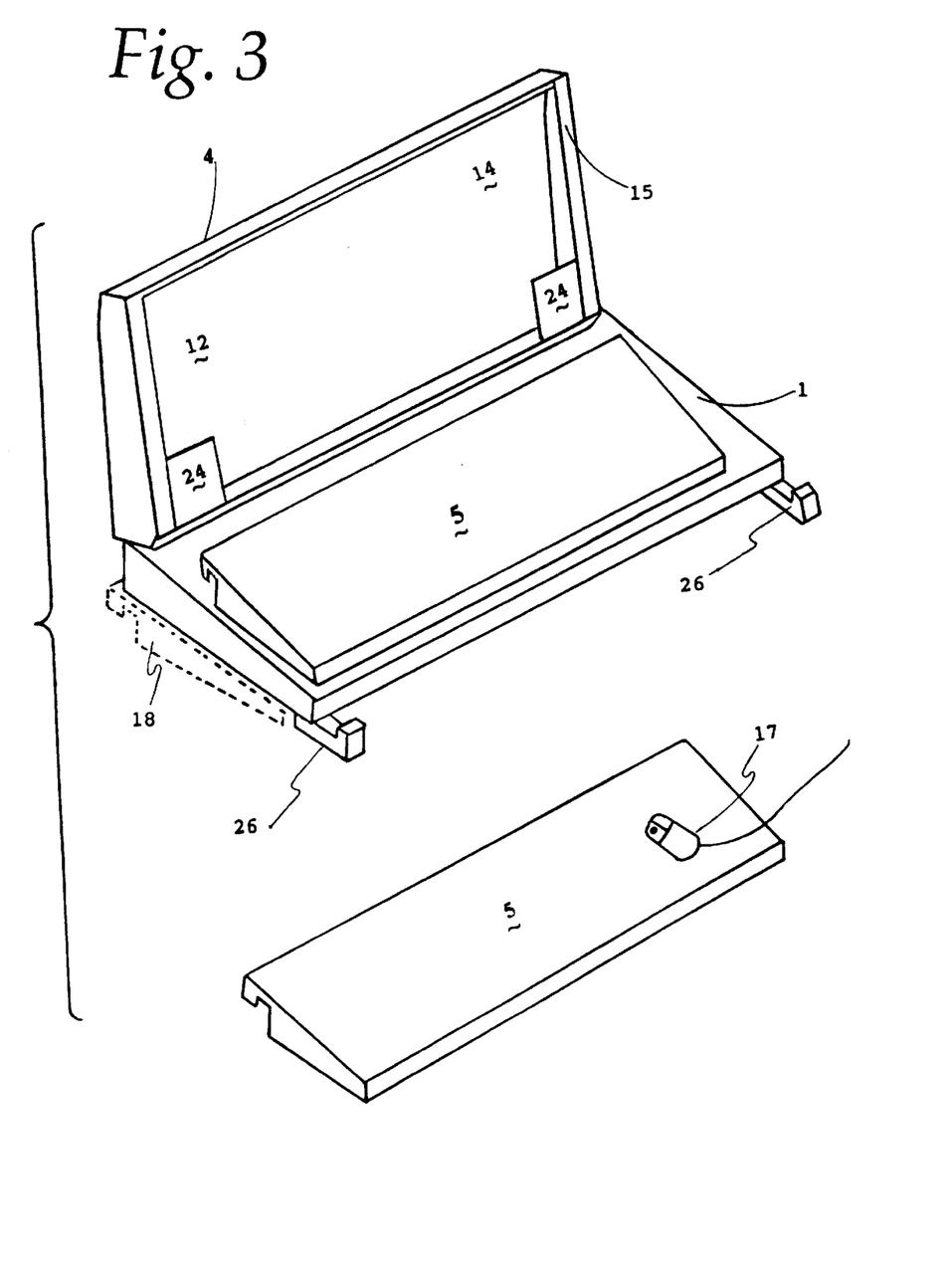
FIG. 3 shows the separate five-inch wide Accessory cover-and-wrist support device 5 in front of the desktop keyboard, and the mortise-and-tenon 26 for attaching to the keyboard. The accessory is shown [(dotted lines)] placed over the keys 5, when Screen is in use. The 'mouse'-is shown on the fabric-covered surface. 17 Also shown (broken lines) is Accessory under the Keyboard itself for space-saving storage. 18 (Hinge-arms are omitted).
Figure 5:
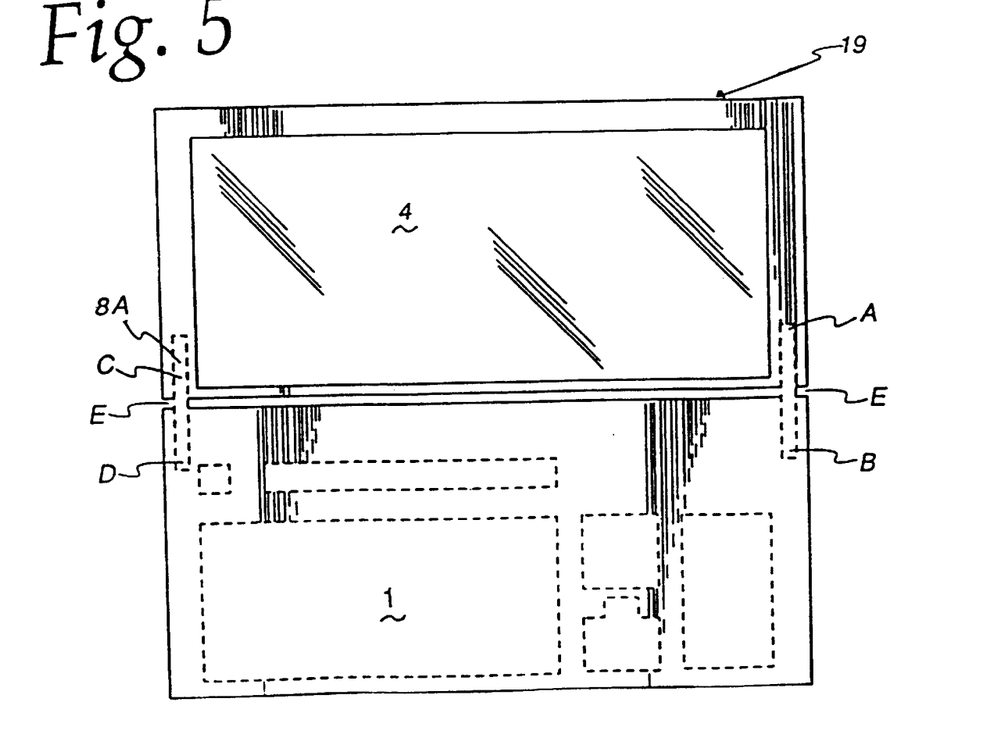
Figure 6:
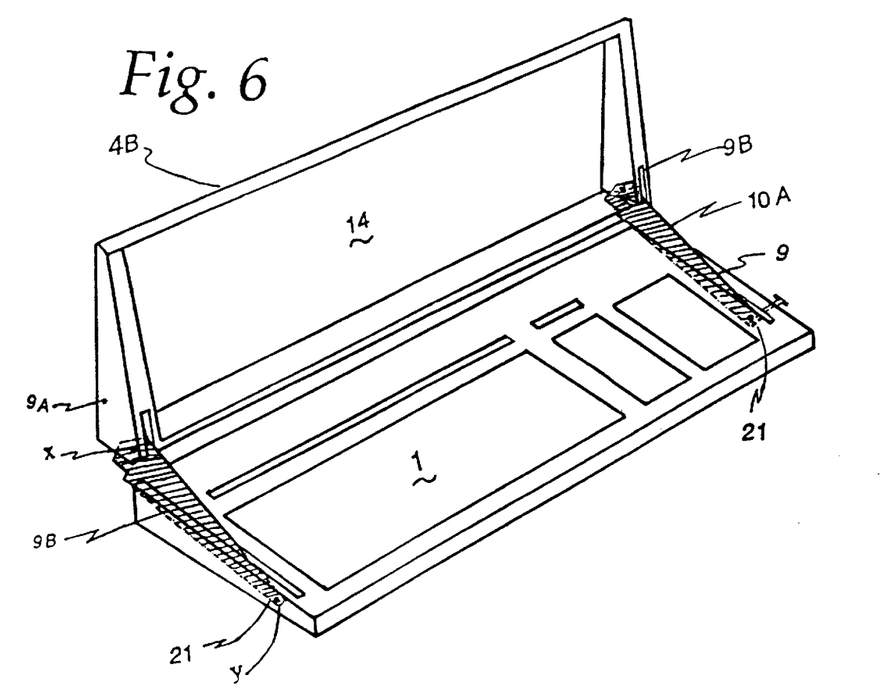
FIGS. 6, 6A show the factory-produced computer desktop keyboard with cover and monitor having the two steel-hinge-arms (of Model 1B), 4B installed internally, in cut-away slots 9B, with removable wing-bolts, 21 as a self contained unit, in open position. Also shown in FIG. 6A is the Cover/Screen Monitor device detached 11 and supported by the two steel arms 9 pivotably rotated to provide a stable base support on the surface behind the keyboard, with the notch stop 9A on sides of cover.
Figure 6A:
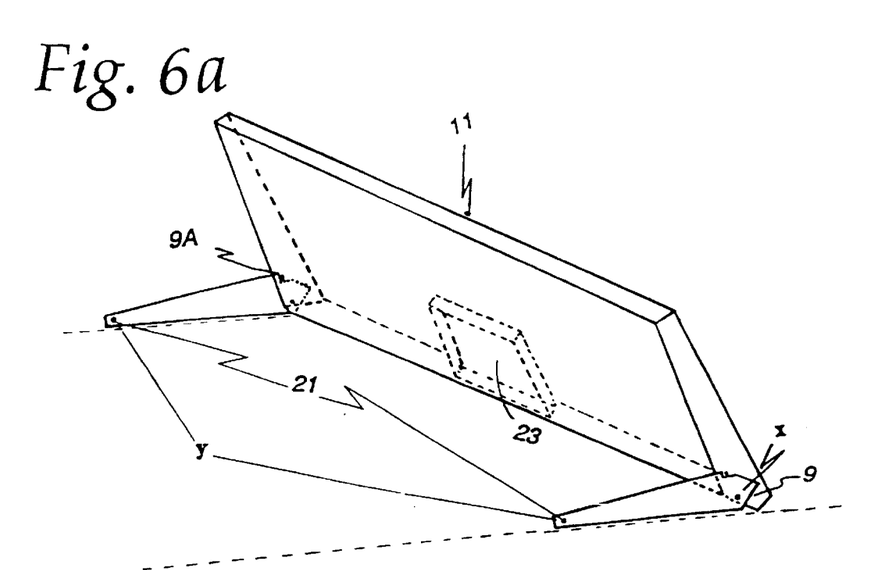
Figure 8:
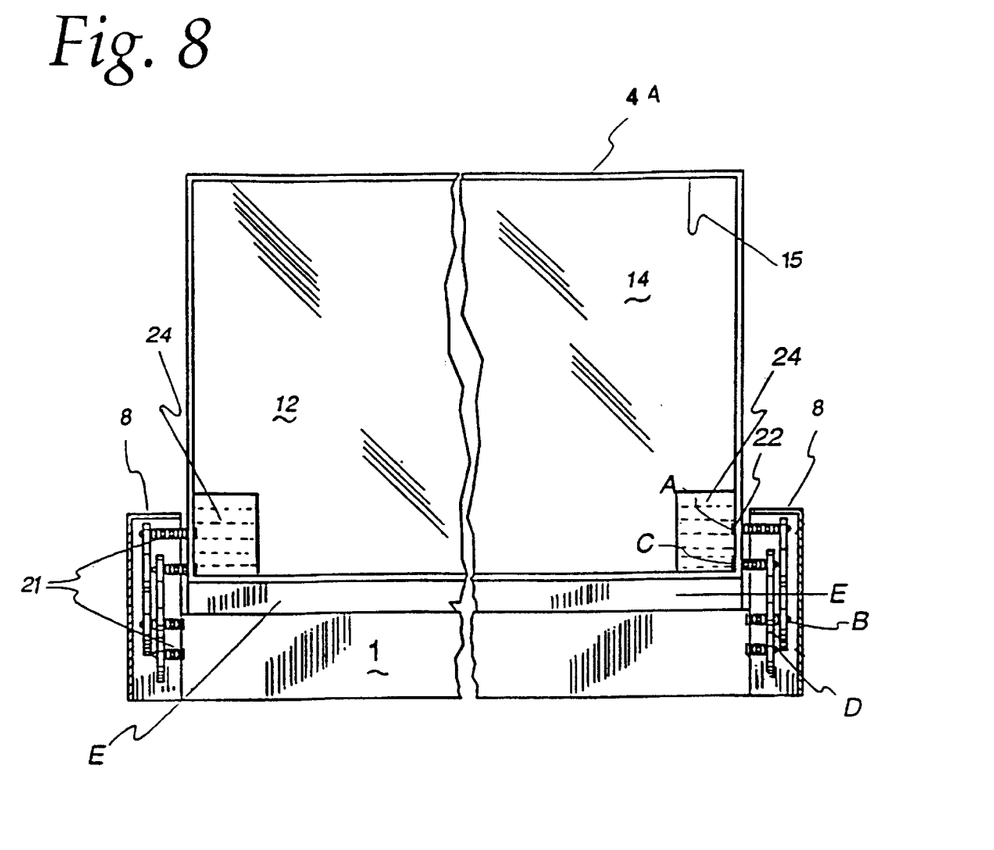
FIG. 8 shows a fragmentary front view of the Model 1A hinging mechanism, and spacing friction washers 21 used to equalize the respective length dimension of the Cover Device 4A as an 'add-on' attachment to the various-sized keyboards.

According to the First Aspect of this Invention, the Desktop Keyboard Cover and Screen-Monitor Device (hereinafter referred to as Model 1A) 4A has been developed to be hinged to desktop keyboards using the first design comprised of a pair of metal housings, externally bolted to the keyboard, with double arms articulating in opposite directions, being the main embodiment of the first application. The designated points of attachment to the sides of the keyboard are shown in FIGS. 5 and 8. 10, 4A And according to the second hinging design of this First Aspect of the invention the Cover/Monitor attachment device is equipped with a pair of single pivoting steel-metal arms 9 bolted with wing-bolts and friction washers to the two sides of the keyboard, being an embodiment of the new matter added in this CIP application (hereinafter referred to as Model 1B). 4B (FIG. 6). These arms pivotably rotate in the same direction, that enables the Cover/Monitor to be opened and the screen placed in various positions at the correct angle of recline for viewing. These two steel hinge-arm members are riveted, with friction-washers, to the base ends of the Cover/Monitor attachment device, at designated pivoting point 'x' [11] and are bolted at the other ends to the sides of the keyboard housing with wing-screws and friction-washers, at the designated point 'y' [11] (FIG. 6). (There is no mechanical connection between the base of the Cover/Monitor and rear edge of the keyboard base as embodied in claims hereunder). By removing the wing-bolts 21 the hinge-arms are pivoted backwards to a fixed notch on the cover 9A to provide base support for viewing when separated from the Keyboard 11 (FIG. 6A). The lower half of the rectangular Cover/Monitor has vertical walls on the perimeter providing for a recessed cavity 15 (FIGS. 3, 8, 12) about ⅝" deep, allowing the Cover device attached to the Desktop Keyboard to be closed without depressing any keys, in case this is necessary, while the power is still turned on. The face-glass of the wide-screen 14 (FIGS. 3, 8) with a length dimension of 18 inches, and a width dimension of 7 inches, provides the 'ceiling' 12 of the recessed cavity for the keyboard cover. (FIGS. 3, 8). The top section of the Cover housing 22 (FIGS. 10, 10A, 10B) provides a space area to accommodate all the hardware, electronic circuitry, and Printed Circuit Board (PCB) components for the LCD or other 'Flat-panel' display technology, as well as two multi-media speakers, and a 3.5" floppy disk drive and port. This "Generic Desktop Keyboard Cover & Monitor Attachment device" 4 (FIG. 3) is so named because it may be fitted to any standard desktop computer keyboard in use today. For although it has a fixed length dimension of 18 inches, it is possible to be fitted to any keyboard with lengths varying from 17 inches up to over 20 inches. 20 (FIG. 8). The methodology herein disclosed is a novel and simple means to accommodate all desktop keyboard sizes. In order to ensure that the hinge-mechanism may be attached in parallel alignment with both the keyboard base housing component and the Cover/Monitor component, spacer friction-washers as previously mentioned 21 (FIGS. 8, 14) are used at the point of contact where the hinge arm-members are bolted to the components. [(FIG. 8)] In cases where the desktop keyboard length dimension is greater than the length dimension of the Cover/Monitor device, then the spacer-washers are placed between the hinge-arm and the Cover/Monitor 10, [11] (FIG. 8); and in cases where the opposite is the case, with the keyboard housing being shorter than the Cover/Monitor, then the spacer-washers are placed between the Keyboard housing and the hinge arm-member to maintain a firm and stable parallel relationship between the components. This ingenious methodology ensures that one standard-sized Keyboard Cover and Monitor can be used in every situation. (FIG. 8). A Key-lock is installed in the Cover unit 27 whereby it may be locked by means of a cabinet-type lock located to the front of the Cover Device. Unauthorized access to the Computer is thereby controlled. Parental or custodial control of the use of computers will be facilitated.(FIG. [8] 10).

Figure 12:
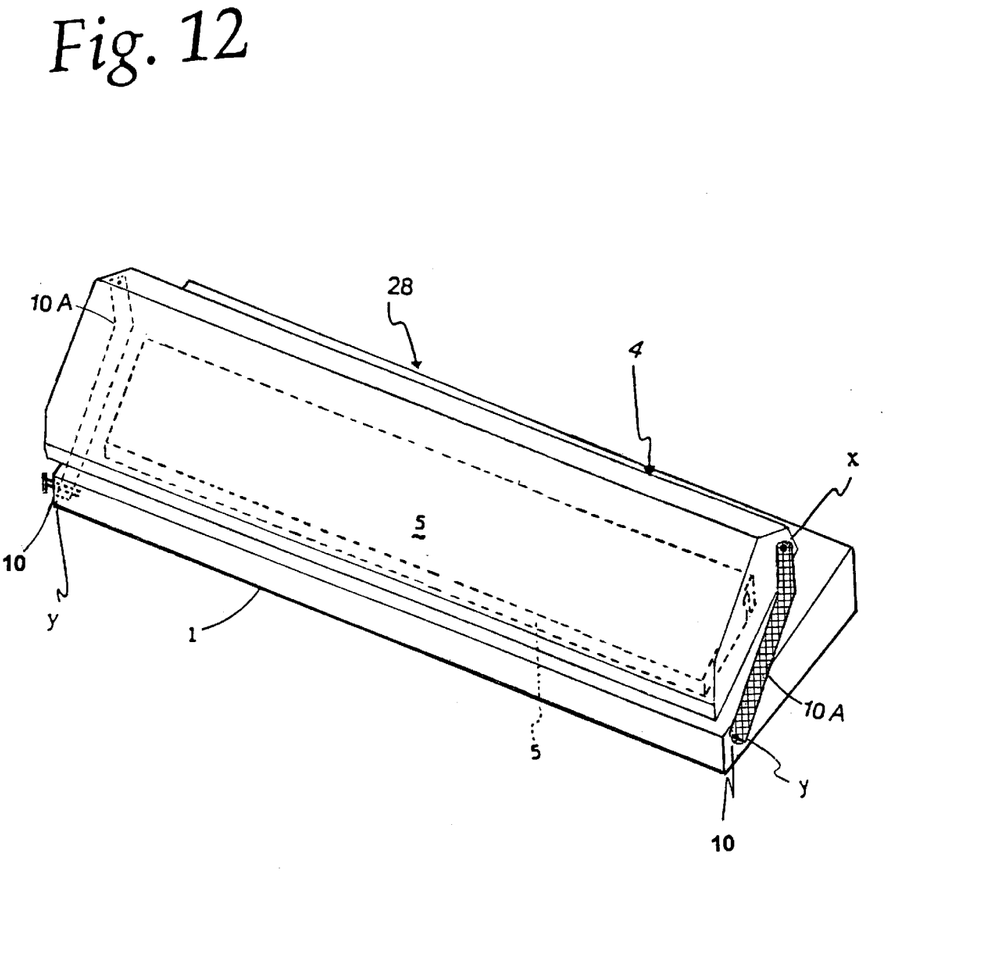
FIG. 12. Shows the Accessory in its "nesting" position over the keys and inside [between] the Cover/Monitor Attachment of Model 1 or 1A; to comprise a compact [single] desktop computer peripheral, for storage or for transporting in a [the special] carrying case.

According to the Second Aspect of this present Invention, the companion Accessory Cover and Wrist Support Device, (herein referred to as Model 2) 5 embodies some of the art of the First Aspect; but does not have a monitor. It is described as follows:

(a) The Keyboard Cover & Wrist Support Accessory is a rectangular frame of Injection Molded plastic material, having vertical walls on the perimeter, approximately ⅝" deep, designed and developed to fit exactly over the standard 104-key Desktop Keyboard, without depressing the keys. Model 2 is essentially the recessed cavity of the bottom section of the Cover attachment of the First Aspect, namely Model 1. 15 (FIGS. 3, 8, 12).

(b) It performs its primary function as a protecting cover for the keys from dust and debris, including food or liquids that could be dropped by operators. 5 (FIG. 3), and also to provide a writing surface and book-rest, 16 (FIG. 11) so that operators do not have to move elsewhere for these reasons.

Figure 11:
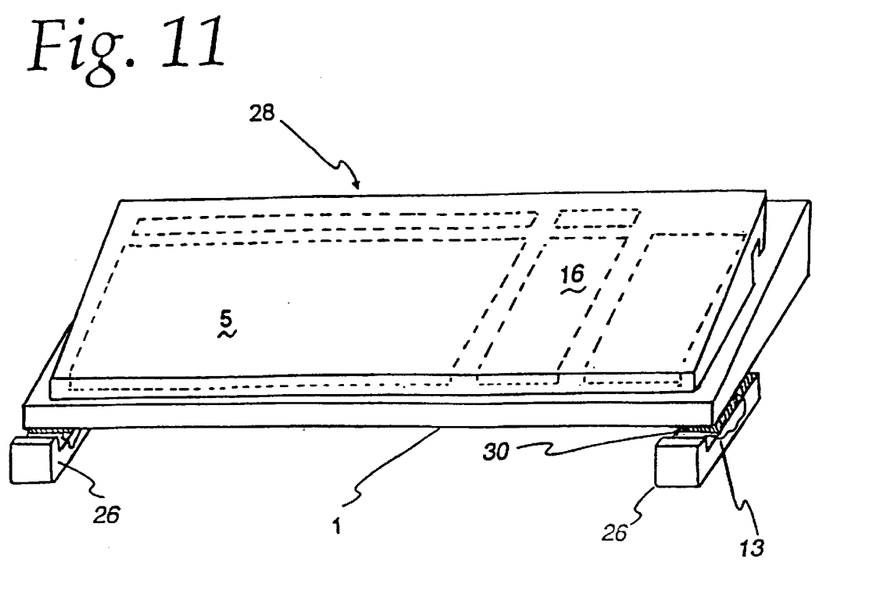
FIG. 11 is a front perspective view showing the Accessory Cover and Wrist Support, in a resting position over the keyboard face, with the mortise and tenon blocks placed under the keyboard with Velcro fastening tape, to receive the Accessory when removed from over the keys. Also shown is the static-dispensing wiring 30 from the fabric on the accessory to the metal ground of the keyboard, embedded in the Velcro tape.

(c) Its second primary function is to provide an ergonomic wrist support device. A natural cotton anti-static fabric is affixed to the top providing a comfortable hand rest and also a 'mouse' pad on this extra-wide full-length wrist support accessory. 5 (FIG. 3) 16 (FIG. 11). The fabric is wired to the keyboard 'ground' 30 connected by the Velcro tape fastening to dissipate any static-electricity build up. The unattached Cover Accessory is removed from resting on the keyboard over the keys, and placed next to the front of the computer keyboard. 5 (FIG. 3) where the device is kept attached in this position to the keyboard by a mortise and tenon means consisting of two blocks of plastic material 1.5"×1"×0.5" placed under the keyboard front and firmly fastened by Velcro tape. 26 (FIGS. 3, 12). The blocks serve to elevate the keyboard to correspond with the height of the accessory for maximum ergonomic effect.

(d) When the Accessory device is not required for a wrist support, it is simply removed from covering the keys and placed under the keyboard; 18 (FIG. 3) to save space on the desktop.

(e) The Accessory may remain 'nested' over the keyboard and inside the closed Cover-with- Monitor, (in the case of Model 1B) and placed as one unit in its carrying bag. 28 (FIG. 12).

According to the Third Aspect of this present invention, the Desktop Keyboard Cover and Screen Monitor attachment device is hingedly attached (using conventional methods of prior art) to the rear edge of the keyboard, creating a compact and composite computer peripheral, combining both keyboard and screen monitor, 6 (FIGS. 7, 9, 13) (herein referred to as Model 3), for all PC and Macintosh workstation configurations, capable of being closed without touching the keys, and capable of being opened to varying positions for viewing; utilizing conventional Liquid Crystal Display (LCD) or more recently-developed (USA) technology for "flat-panel" display screens. This composite Cover with Screen Monitor is essentially identical in purpose and function as the means described under the First Aspect (Model 1A and Model 1B); the [sole] variation being that instead of having externally-mounted hinging apparatus the combined factory-produced model is equipped with conventional hinging mechanisms consisting of articulating hinges with axle and friction sockets connecting together the wide Cover and Screen Monitor attachment device at its base end to the desktop keyboard at its rear edge. (FIG. 7). Similar to the First Aspect above-mentioned, the Desktop Keyboard Cover and Screen Monitor attachment under this Third Aspect is also detachable from the keyboard base by removal of the two lower axles of the articulating hinges. 7B. (FIG. 7). The Cover/Monitor attachment device housing is made of standard Injection-Molded plastic material.

It is readily apparent that the above-described Computer Desktop Keyboard Cover and built-in Screen Monitor apparatus for electronic computers meets all of the objects mentioned above, and also has the advantage of wide commercial utility. It should be understood that the specific form of the invention hereinbefore described is intended to be representative only, as certain modifications within the scope of the these principles will be apparent to those skilled in the art addressed therein. Accordingly reference should be made to the following claims in determining the full scope of the invention.

BRIEF DESCRIPTION OF THE DRAWINGS
(CIP)

FIGS. 4a 4b 4c show the exterior metal housings and hinging mechanism of the First Aspect, 4A (Model 1A)

FIG. 5 & FIG. 5A show the factory-produced computer desktop keyboard with cover and monitor having the double acting articulating hinge mechanism of Model 1A; installed internally in cut-away slots 8a.

FIG. 13. The Attachment 'add-on-kit' 18 (FIG. 13) contains all components to upgrade existing keyboards: namely:
a) The Desktop Cover/Monitor attachment itself, 4
b) The Accessory Wrist Support and Cover, 5
c) The mortise and tenon blocks with Velcro tape, 26
d) The screws and the wing-bolts & friction washers for bolting to the keyboard; 21
e) The Monitor cable with parallel port for plugging into the CPU (or Interface Seuer) M
f) A power supply cable with transformer; P, T.
g) Either the metal housing of Model 1A 4A or, the steel hinge-arms of Model 1B 4B
h) An instruction sheet showing the precise location for drilling holes in the keyboard base for bolting the hinge arms thereto. 10

Figure 13:
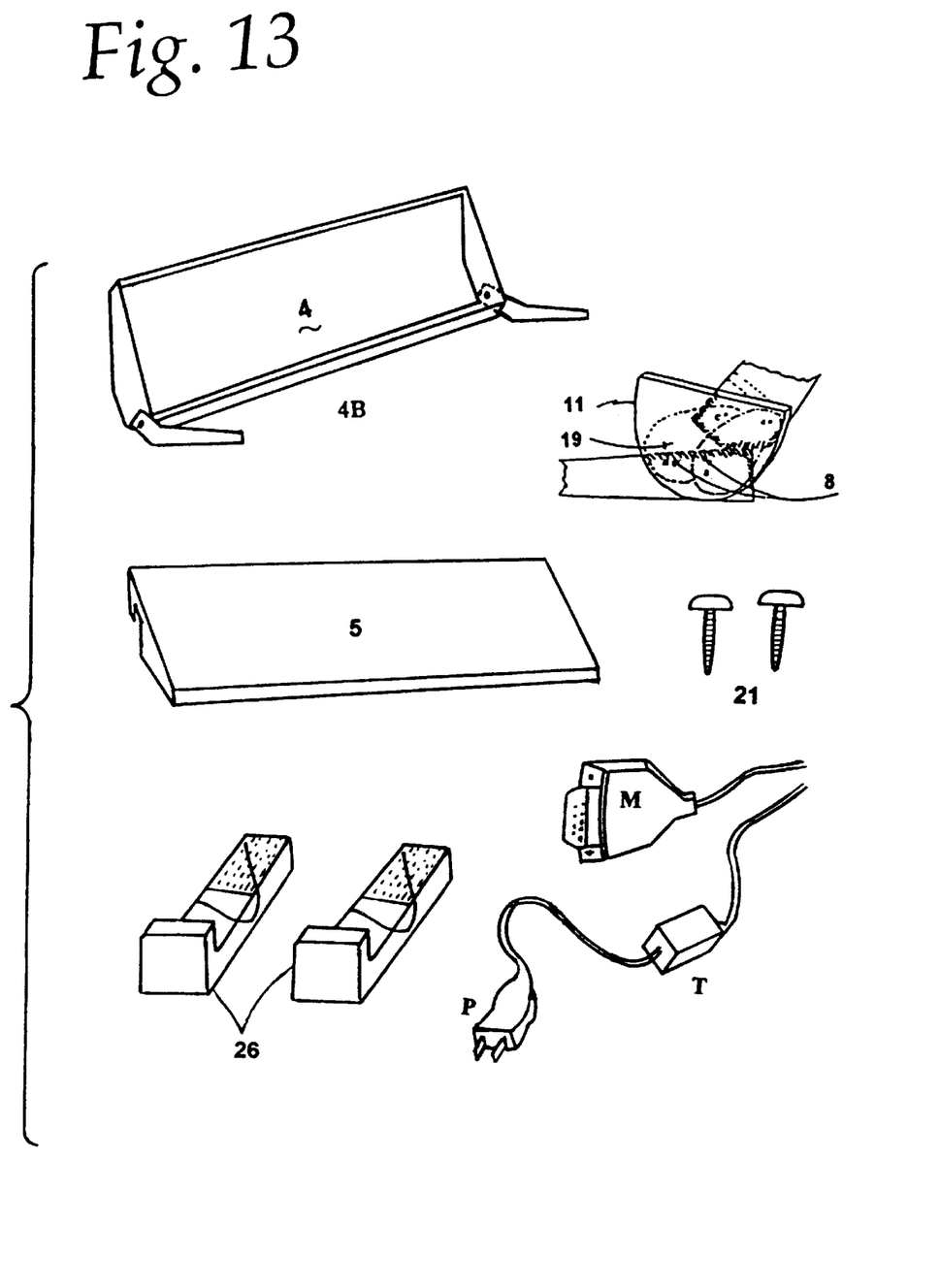

Note: The Factory-produced Compact Composite Computer Peripheral package will contain only the following:
1. The Keyboard and Monitor peripheral, with removable lower axles. 4
2. The Accessory Wrist Support and Cover. 5
3. The mortise and tenon blocks and Velcro tape 26
4. The Monitor cable with parallel port. M
5. A Power supply cable and Transformer. P T

| Codes used in the General Description, and with the drawings. | | FIGS. |
|---|---|---|
| 1 | KEYBOARD | 1 |
| 2. | CPU | 1 |
| 2A | Network Interface | 2 |
| 3 | CRT MONITOR | 1 2 |
| 3A | HOOD AND TRAY | 1 |
| 4, | Desktop Keyboard Cover/Monitor ATTACHMENT Model 1 | 3, 4, 11, 13 |
| 4A | Attachment with metal hinge housing, oscillating arms Model 1A | 5, 8, 13 |
| 4B | Attachment with pivoting long metal arms, Model 1B | 6 4c, 12 |
| 5 | ACCESSORY DEVICE Cover, Wrist support, Anti-static. Model 2 | 3, 12, 13 |

-continued

| Codes used in the General Description, and with the drawings. | | FIGS. |
|---|---|---|
| 6 | FACTORY PRODUCED COMPACT COMPOSITE PERIPHERAL Model 3. | 7, 9 |
| 6x, 6y, 6z. | COMPOSITE PERIPHERAL in closed, half-open, fully open positions | 7 |
| 7 | THE 2-PERIPHERAL CONFIGURATION | 2 |
| 7A. | Hinging mechanism of prior art with removable lower axles. | 7 |
| 7B | Two removable lower axles of hinges | 7 |
| 8 | Detail of 4A HOUSING HINGE MECHANISM - | 4a, 4b, 5, 5A, 8, 13 |
| 8a | CUT-AWAY SLOTS FOR HINGE MECHANISM | 5 |
| 9 | Detail of 4B STEEL HINGE ARM MEMBERS - | 13 |
| 9A | Notch 'stop' for steel-arms to support Screen | 6 |
| 9B | CUT-AWAY SLOTS FOR STEEL HINGE ARMS - SIDE VIEW | 6 |
| 10 | HINGE BOLT POSITIONS 4A | 6 8 |
| 10A | Steel hinging-arms | 4c |
| 11 | Cover and Screen Display attachment separate from keyboard | 6 |
| 12. | CEILING TO CAVITY - GLASS FACE | 8 |
| 13 | VELCRO FASTENING TAPE | 12 |
| 14 | 18" GLASS FACE OF MONITOR IN COVER | 3, 8 |
| 15 | RECESSED CAVITY IN MONITOR | 3 8 12 |
| 16 | HARD TOP fabric covered SURFACE FOR WRIST SUPPORT ETC. | 12 |
| 17 | MOUSE PAD on fabric surface | 3 |
| 18 | ACCESSORY UNDER KEYBOARD | 3 |
| 19 | MODELS 1A and 1B WITH INTERNALLY INSTALLED HINGES | 5, 6 |
| 20 | ADAPTING 'ADD-ON' TO VARIOUS SIZES OF KEYBOARDS | 8 |
| 21 | WING-BOLTS, SCREWS, SPACER FRICTION WASHERS | 6 8 13 |
| 22 | HOLLOW COMPARTMENT IN COVER ATTACHMENT UNIT | 10, 10A, 10B |
| 23 | 3.5" DISK DRIVE AND PORT | 10, 6A |
| 24 | MULTIMEDIA SPEAKERS | 10 |
| 25 | REMOVABLE DOOR PANEL TO COMPARTMENT | 10 |
| 26 | MORTISE & TENON BLOCKS WITH VELCRO & GROUNDING WIRE | 3 11 |
| 27 | KEY LOCK | 10 |
| 28 | NESTING ACCESSORY WITHIN KEYBORD AND COVER/MONITOR | 12 |
| 29. | MAGAZINE CLIPPING ADAPTED TO SHOW COVER ATTACHED | 9 |
| 30 | GROUND WIRE | 11 |
| x | Riveted points on Cover, | 6, 6A |
| y | Wing-screw points on keyboard base | 6, 6A |

| CROSS REFERENCE INDEX (13 Pages) | | Text References |
|---|---|---|
| FIG. 1 | CONVENTIONAL LAY-OUT AS AT PRESENT | 1 2 3 3A |
| FIG. 2 | FUTURE WORK-STATION-ONLY 2 PERIPHERALS CPU (or server) Keyboard | 1 2 2A 4 7 15 |

-continued

Figures 4A, 4B:
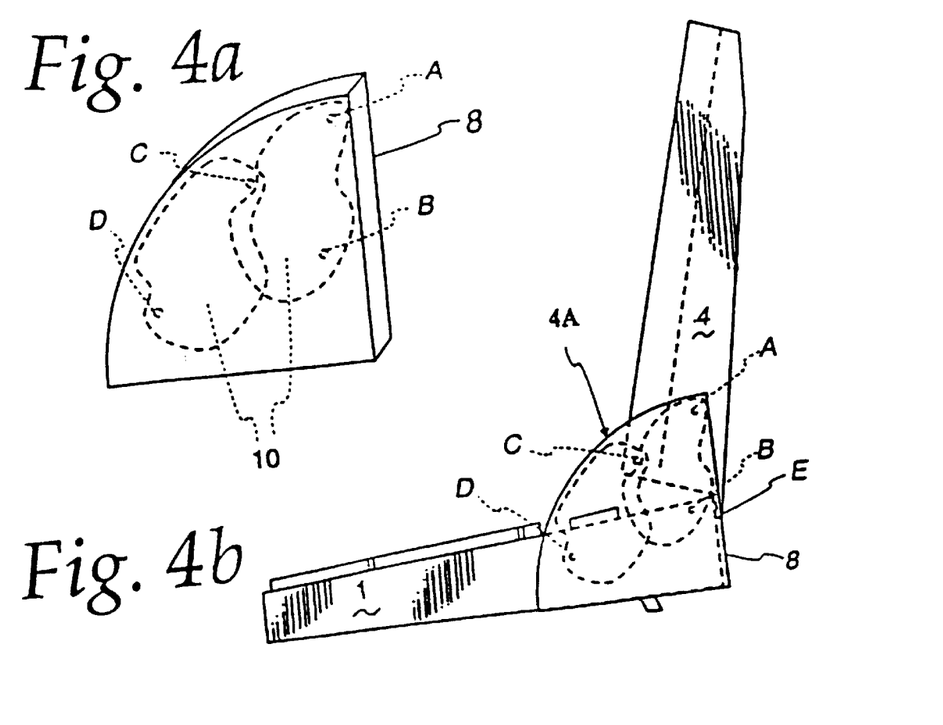
Figure 4C:
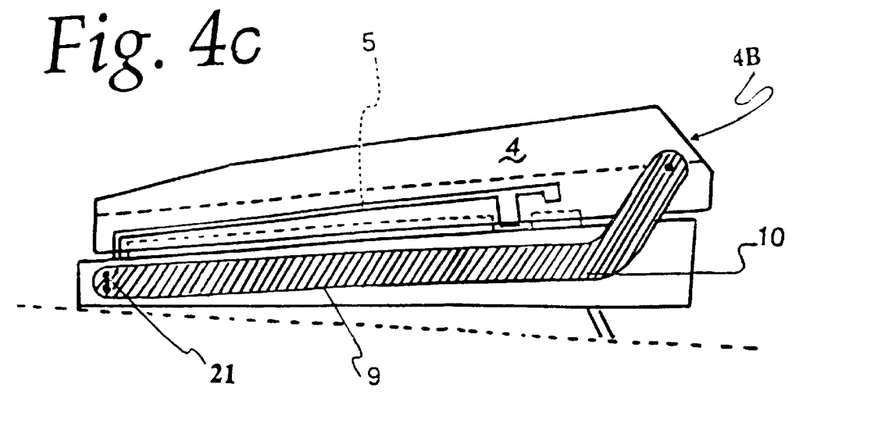
FIG. 4c shows the two external, long and narrow steel hinge-arms added in the new matter of the present CIP application. 4B (Model 1B).
Figure 5A:
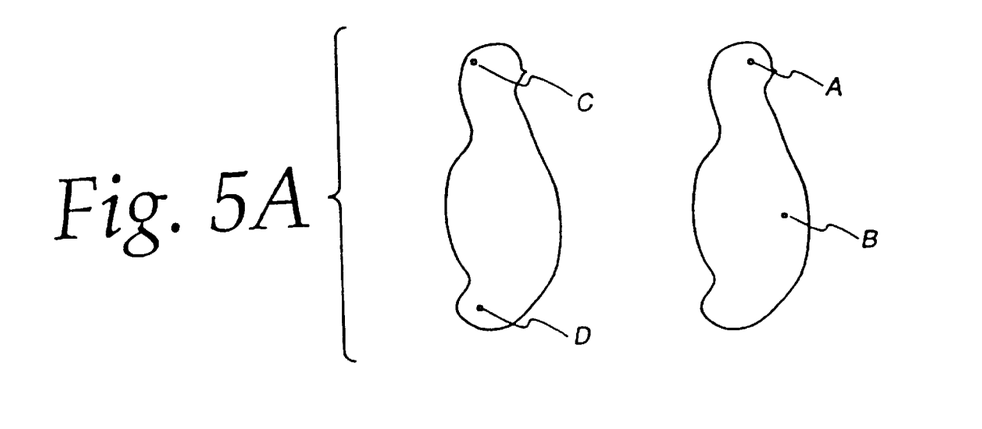
Figure 7A:
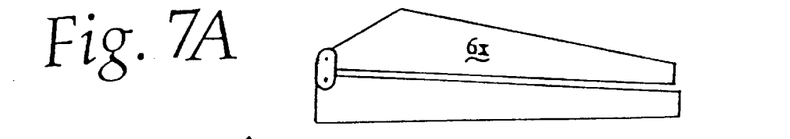
Figure 7B:
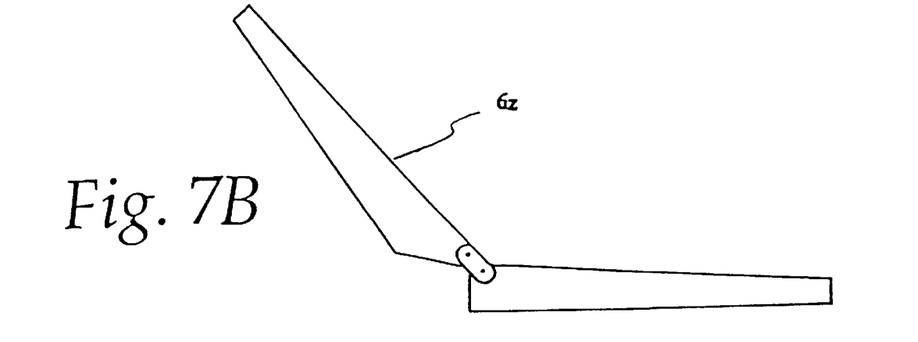
Figure 9:
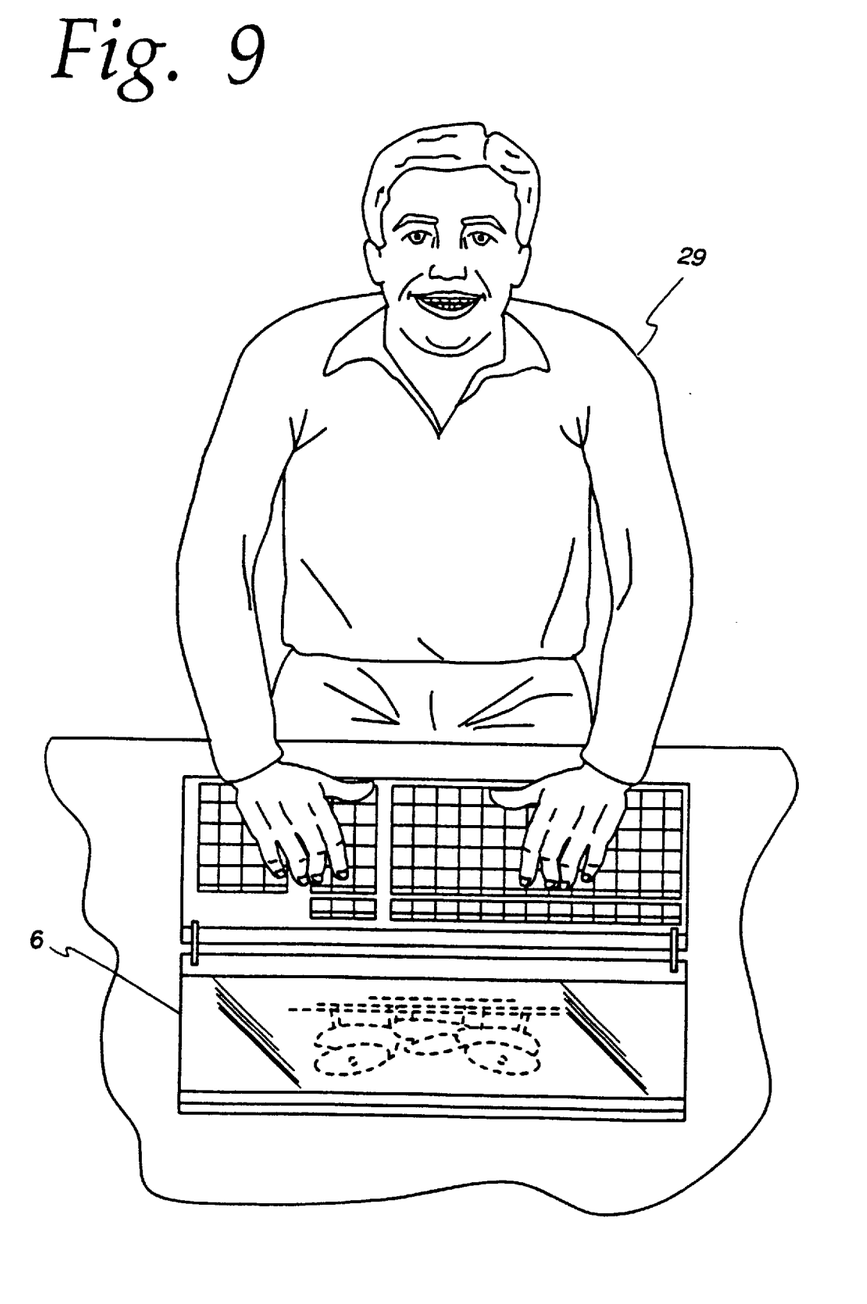
FIG. 9. is an overhead perspective view adapted from a Magazine Clipping of a Laptop computer with its Screen Monitor in open position. The keyboard and screen have been enlarged to represent a Desktop Keyboard with the Attachment means of this Invention. This is included in the Drawings to convey an overall picture of the usefulness of the Invention to the public at large.
Figure 10:
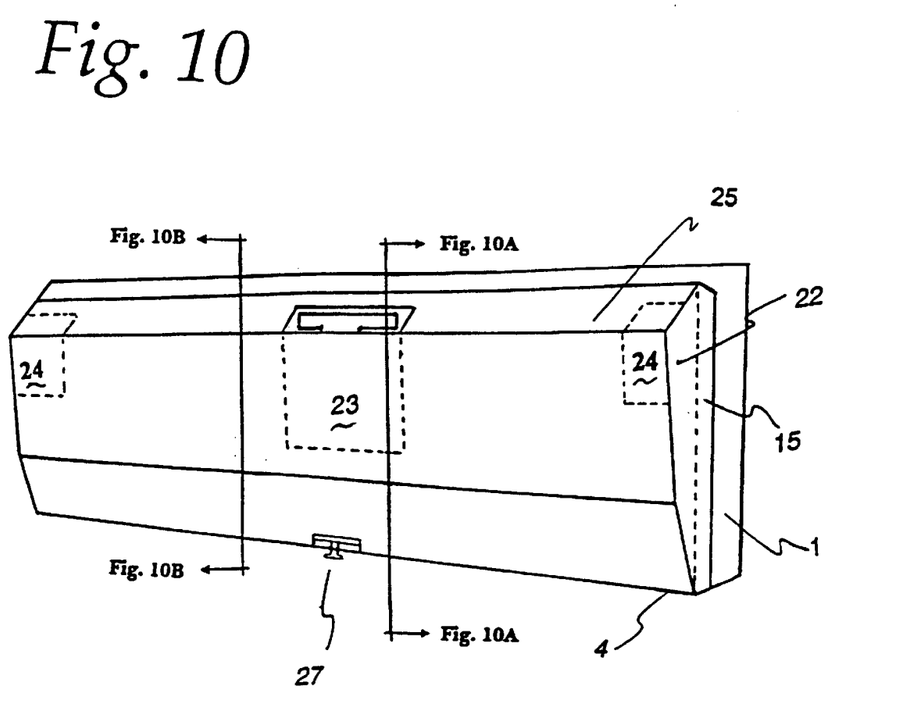
FIG. 10 is a perspective side view of the Attachment Device 4 showing the internal compartments 22 for all electrical/electronic components for the LCD or Flat Panel Display technology; and the location of the 3.5" floppy disk port 23 and the two multi-media speakers. 24.
Figure 10A:
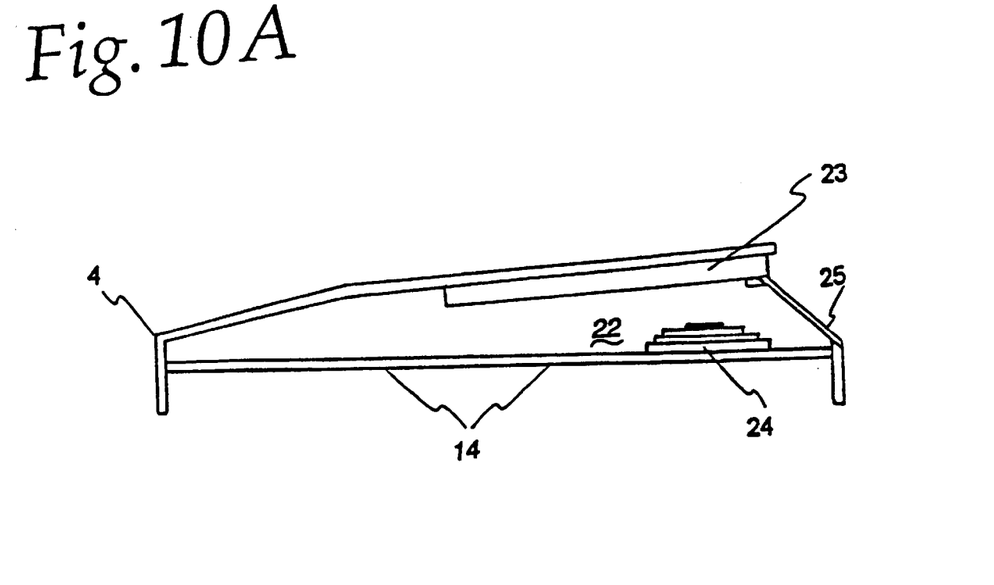
FIG. 10A & FIG. 10B [is a side view] are cross-sectional drawings of the internal compartments of the Cover and Monitor at the center and ends of the attachment device. The glass panel 12 is the 'ceiling' of the recessed cavity 15 that accommodates the protruding keys, when the cover is closed. The space compartment behind the glass face, 22 in the top section of Cover/Monitor device, houses the display-screen printed-circuit-boards (PCB) and components. The removable access cover-panel to this space 25 is shown.
Figure 10B:
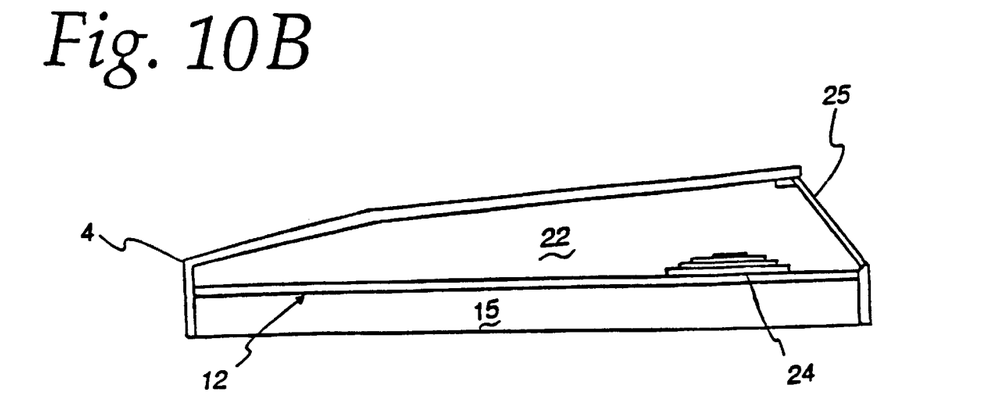

| | CROSS REFERENCE INDEX (13 Pages) | Text References |
|---|---|---|
| FIG. 3 | KEYBOARD, ATTACHMENT DEVICE & ACCESSORY Model 2 | 1 4 5 12 14 15 17 18 24 26 |
| FIG. 4a, 4b, 4c | DEVICE IN OPEN POSITION SHOWING MODEL(1(a) HINGES. | 1 4 4A 4B 8 10 10A 21 ABCDE |
| FIG. 5, 5A | HINGE MECHANISM-DETAIL INSTALLED MODEL 1(a) FCTY MODEL | 1 4 8A 19, ABCDE |
| FIG. 6, 6A | HINGE ARMS (steel) MODEL 1(b) supporting detached monitor | 1 4B 9 9A 9B 10A 11 21 23 x y |
| FIG. 7, 7A | FACTORY PRODUCED COMPOSITE MODEL 3 WITH FIXED HINGES | 1 6, 6x, 6y, 6z 7A 7B, 14 |
| FIG. 8 | ATTACHMENT DEVICE MODEL 1(a) WITH HINGE/SPACER | 1 4A 8 12 14 15 21 24 ABCDE |
| FIG. 9 | ADAPTED MAGAZINE CLIPPING OF OVER-HEAD PERSPECTIVE | 6 29 |
| FIG. 10 | TOP-SIDE VIEW COMPARTMENTS FOR HARDWARE | 1 4 10A 10B 15 22 23 24 25 27 |
| FIG. 10A, 10B. | DETAIL INTERNAL SPACE - SPEAKERS/ DISK PORT (SIDE VIEWS | 4, 12, 15 22 23 24 25 |
| FIG. 11 | ACCESSORY Model 2 ON KEYBOARD WITH MORTISE & TENON | 1 5 13 16 26 28 30 |
| FIG. 12 | VIEW OF - ACCESSORY NESTING BETWEEN [INSIDE] COVER AND KEYBOARD. | 1 4 5 9 28 x y |
| FIG. 13. | CONTENTS OF ADD-ON DO IT YOURSELF KIT | 4 4A 5 8 9 21 30 T. P, C, |

What is claimed is:

1. In a desktop computer system wherein the computer system has a main body containing a central processing unit therein and a stand-alone desktop keyboard electrically connected to the main body, said keyboard having a housing body with front and back edges and left and right sides and is supported on a surface, the keyboard further having mounted thereon a keyboard attachment device comprising:
    a) two metal housings being bolted to said left and right sides of the keyboard, each of said metal housings having a pair of double-acting articulating hinge arm members located therein, said hinge arm members rotate in parallel paths of opposite direction;
    b) a cover portion hingedly supported between said two metal housings, said cover portion having an interior side, an exterior side, a front end and a base end, said interior side including a recessed cavity containing a flat panel display screen potion mounted inside said attachment device equipped with liquid crystal display, or other flat-panel display technology of prior art the said cover portion being foldable between an open and closed position;
    c) the open position being vertical to said keyboard support surface wherein said base end of said cover portion rests against said back edge of said keyboard to provide support to said keyboard attachment device in the open position, said flat panel display screen being visible in the open position;
    d) the closed position being placed over said keyboard to provide protection of the keyboard when not in use, said recessed cavity accommodating keyboard keys within said cover, said front end having a cabinet lock positioned therein to lock the cover to the keyboard when in the closed position;
    e) the cover portion and said flat-panel display screen keyboard attachment device being electrically connected to said main body of said desktop computer system, said flat-panel display screen having a separate power supply.

2. In a desktop computer system wherein the computer system has a main body containing a central processing unit therein and a stand-alone desktop keyboard electrically connected to the main body, said keyboard having front and back edges and left and right sides and is supported on a surface, the keyboard further having mounted thereon a keyboard attachment device comprising a cover and flat-panel display screen portion mounted inside said attachment device being equipped with liquid crystal display or other flat-panel display technology of prior art comprising a composite computer peripheral, according to claim 1, wherein:
    a) said composite computer peripheral comprising said desktop keyboard, said keyboard attachment device with cover portion and display screen portion, and said accessory wrist support and keyboard cover device, said computer peripheral being an entirely new composite three-in-one data-input and output device including a keyboard means, a display screen means, a 3.5" floppy disc means and multimedia speaker means, without requiring use of traditional CRT screen monitors;
    b) said computer peripheral being readily transportable in a hand-carried traveling bag for use with said computer system CPU main bodies or with modem and Internet interfacing servers in business places, in homes and classrooms or other educational and commercial environments.

3. In a desktop computer system wherein the computer system has a main body containing a central processing unit therein and a stand-alone desktop keyboard electrically connected to the main body, said keyboard having front and back edges and left and right sides and is supported on a surface the keyboard further having mounted thereon a keyboard attachment device comprising a cover portion and a flat-panel display screen portion mounted inside said attachment device, wherein:
    a) said cover portion being hingedly supported between two narrow steel hinge-arms having one end of said two hinge-arms riveted with friction washers to the sides at the back end of said cover portion, and the other end of said two hinge-arms being bolted to said left and right front sides of said keyboard with hand-driven wing-screw bolts and friction washers constituting a composite computer peripheral unit;
    b) said hinge-arms being rotatable in parallel paths of same direction, enabling said keyboard attachment device to be raised vertically to variable positions over said keyboard, by means of said riveted and bolted hinge-arms and friction washers;
    c) said cover portion having an interior-side, an exterior side, a front end and a base end, said interior side including a recessed cavity containing a flat-panel display screen, said cover portion being foldable between an open and closed position wherein said base end of said cover portion rests against back edge of said keyboard in open position, said cover portion being not attached nor mechanically connected to said back edge of said keyboard;

d) said hinge-arms being detachable from said keyboard by removing said wing-screw bolts being still riveted to cover portion of attachment device;

e) said keyboard attachment device being placed in open position vertical to said support surface behind the keyboard, being maintained in said vertical position for viewing by said steel hinge-arms being manually rotated backwards for base support to said cover and flat-panel display screen;

f) said cover portion being re-bolted to said left and right sides of said keyboard with said wing-screw bolts re-constituting said keyboard and said cover and flat-panel display screen back into said composite computer peripheral unit again;

g) said cover and flat-panel display screen attachment device being electrically connected to the CPU main body or network server, having a separate power supply.

4. In a desktop computer system wherein the computer system has a main body containing a central processing unit therein and a stand-alone desktop keyboard with keyboard keys electrically connected to the main body, said keyboard having front and back edges and left and right sides and is supported on a surface, the keyboard further having mounted thereon a keyboard attachment device comprising a cover portion and a flat-panel display screen portion mounted inside said attachment device according to claim 3, wherein:

a) the said desktop computer system further including an accessory wrist support and cover device, having front and back edges and left right sides, and further including a ground wire connected to a utility outlet to dissipate static electricity;

b) said accessory and cover serves as an ergonomic wrist support device over five inches wide to prevent or ameliorate Carpal Tunnel Syndrome disease, or other stressed conditions of hands wrists and arms;

c) said accessory being used as said ergonomic wrist support device when placed in front of and attached to said keyboard by a double mortise-and-tenon means, the mortise counterpart being plastic blocks having approximate dimensions of 2"×1"×½", and the tenon counterpart being the rib of the said front edge of said wrist support accessory, said mortise blocks being placed under the front edges of said left and said right sides of said keyboard, being affixed by velcro fastening tape means, and said tenon rib being fitted into the two mortise slots, thereby lining together both units.

5. In a desktop computer system wherein the computer system has a main body containing a central processing unit therein and a stand-alone desktop keyboard electrically connected to the main body, said keyboard having front and back edges and left and right sides and is supported on a surface, the keyboard further having mounted thereon a keyboard attachment device comprising a cover portion and a flat-panel display screen portion mounted inside said attachment device, said attachment device being attached to the said left and said right front sides of the said keyboard said cover portion being not attached nor mechanically connected to said back edge of said keyboard, according to claim 4, wherein:

a) said attachment device being hingedly supported between two narrow steel hinge-arms having one end of said two hinge-arms riveted with friction washers to the sides at the back end of said cover portion, and the other end of said two hinge-arms being bolted to said left and right front sides of said keyboard with hand-driven wing-screw bolts and friction washers constituting a composite computer peripheral unit;

b) said hinge-arms being rotatable in parallel paths of same direction, enabling said attachment device to be raised vertically to variable positions over said keyboard, by means of said two steel hinge-arms and friction washers riveted and bolted to said sides of said cover portion and of said sides of said keyboard;

c) the said desktop computer system further including an accessory wrist support and covering device, said accessory support and covering device having an interior side, and exterior side, said interior side including a recessed cavity that accommodates said desktop keys, said accessory being nested within said cover portion, said accessory being of smaller dimension than-said cover portion;

d) said accessory and wrist support device being in said nesting position when sandwiched between said desktop keyboard face, at the bottom, and said cover portion, at the top, for convenient packaging and transportation;

e) said keyboard base, said accessory device and said keyboard attachment and cover device being readily hand-carried in a carrying case being one composite computer peripheral.

6. In a desktop computer system wherein the computer system has a main body containing a central processing unit therein and a stand alone desktop keyboard electrically connected to the main body, or in any other desktop system or configuration having data entry machines or typewriters having keyboard keys said keyboards having a housing body with a top side and a base with front and back edges supported on a surface being data entry machines or typewriters for manual operation, according to claim 5, wherein:

a) the said desktop computer system or other data-entry configuration further including a wrist support and cover accessory device for said keyboard keys with a ground wire connected to a utility outlet to dissipate static electricity;

b) said accessory wrist support and cover device being manually placed in front of said keyboards of all descriptions for use by operators to facilitate data-entry and to prevent or ameliorate Carpal Tunnel Syndrome disease or other stressful physical conditions caused to arms, wrists and hands by reason of typing or other key-entry operations;

c) said accessory wrist support and cover device having an interior side and exterior side, said interior side including a recessed cavity to accommodate said keyboard keys said accessory being used to cover and protect said keyboard keys from dust and debris, said exterior side being a writing surface and book-rest when manually placed over said keyboard housing body;

d) said accessory having dimensions of not less than 5 inches wide, approximately ½" high at the front end, and approximately 1 inch high at the back edge, and length determined by dimension of said housing of said data entry or typewriter unit, generally not more than 22" nor less than 6" long;

e) said accessory and cover device being connected to the keyboard by means of a double mortise-and-tenon locking means, said mortise counterpart portion being plastic blocks having approximate dimensions of 2"×1"×½" attached by velcro fastening tape to under-side of front end of said keyboard base, said tenon counterpart being the rib of said front edge of said accessory and cover device;

f) said accessory having a natural fabric affixed to the top flat surface for operator comfort and to dissipate static electricity inherent in all electronic and electrical systems by means of contact of said around wire imbedded in said accessory to said ground wire attached to said desktop keyboard; being linked together by said mortise-and-tenon means, said accessory with said fabric cover also serving as a mouse-pad for computer operations;

g) the bottom portion of the said accessory and cover having said recessed cavity being a tray for storage of small office paraphernalia, said accessory being turned upside down.

7. In a desktop computer system wherein the computer system has a main body containing a central processing unit, therein and a stand-alone desktop keyboard electrically connected to the main body, said keyboard having a housing body with a top-side and a base supported on a surface, said keyboard further having hingedly mounted on said top-side of said keyboard housing body a keyboard attachment device comprising a cover portion and a flat-panel display screen portion mounted inside said attachment device, said device having an interior side, an exterior side, a front end and a back end, said interior side including a recessed cavity containing said flat-panel screen, said desktop keyboard with said attachment device being a compact input and output computer peripheral unit for desktop use, said display screen portion having installed therein liquid crystal display technology or other flat-panel electronic technology means of prior art, wherein:

a) said compact computer peripheral for desktop use has said cover portion hingedly connected at said back end to the rear edge of said top-side of said housing body by means of two articulating double-axle hinging mechanisms of prior art, affixed to and forming part of said keyboard housing body;

b) said compact computer peripheral being a composite data-input and screen-display-output device for use with all standard PC and Mackintosh or other workstations, including networks and the Internet interfacing configurations;

c) said cover portion of said desktop computer peripheral being foldable between an open and closed position, said open position being variable for viewing and in said closed position providing protection for the keys of said keyboard when not in use, said keys being accommodated within said recessed cavity;

d) said cover and flat-panel display screen attachment device being detachable from said keyboard by removal of the bottom axles of said two articulating double-axle hinging mechanisms;

e) being detached from said keyboard, said-cover and display screen attachment device being placed in vertical positions on said support surface behind said keyboard;

f) said attachment device being readily re-attachable to said keyboard by replacing said axles to become said composite peripheral unit again;

g) said data-input and screen-display-output-desktop computer peripheral being connected electrically to said central processing unit or server in any stand-alone environment, or connected to any networking and/or Internet interfacing units in a classroom or other like configured environment;

h) said cover and display screen portions of said desktop computer peripheral having space compartments containing electronic components for said liquid crystal display or other flat-panel electronic technology means of prior art including printed circuit boards and all other electrical hardware for PC compatible screen monitors using latest color screen technology and multimedia technology, said compartment having a removable access panel to said compartment space areas;

i) said attachment device of said desktop computer peripheral being equipped with standard multimedia speakers, and said cover portion being fitted with one floppy-disk port and said floppy-disk-drive mechanism;

j) said data-input and display-screen-output desktop compact computer peripheral having a separate power supply.

* * * * *